R. J. D'AQUIN.
SYSTEM OF IRRIGATION.
APPLICATION FILED AUG. 11, 1915.

1,229,898.

Patented June 12, 1917.
3 SHEETS—SHEET 1.

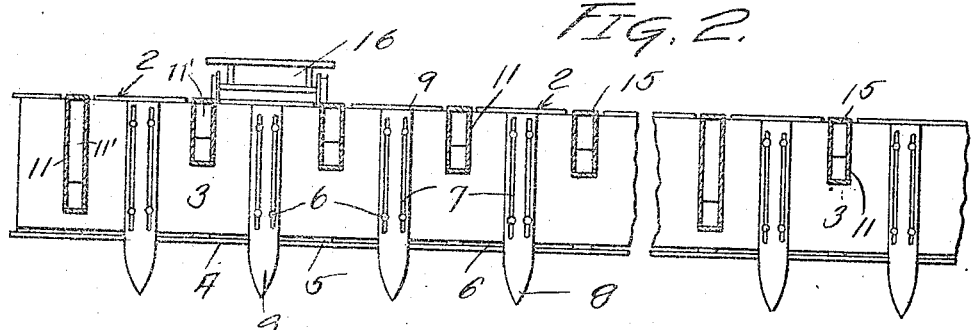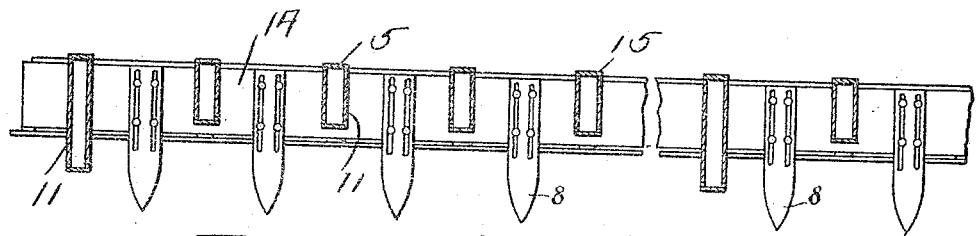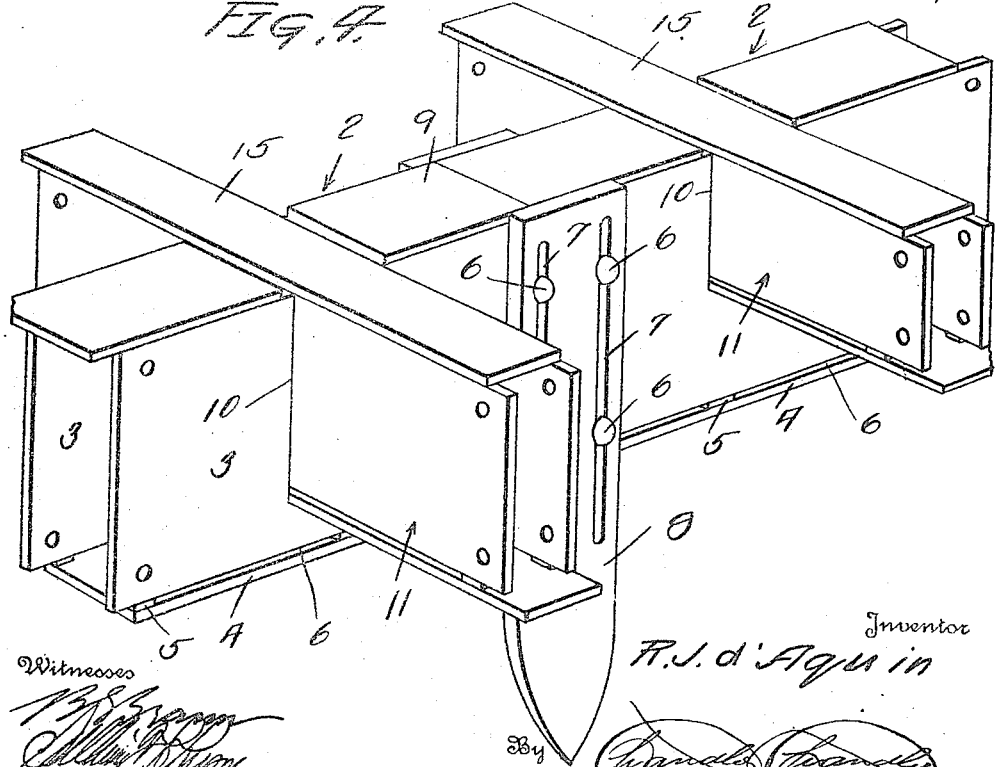

R. J. D'AQUIN.
SYSTEM OF IRRIGATION.
APPLICATION FILED AUG. 11, 1915.
1,229,898.
Patented June 12, 1917.
3 SHEETS—SHEET 3.
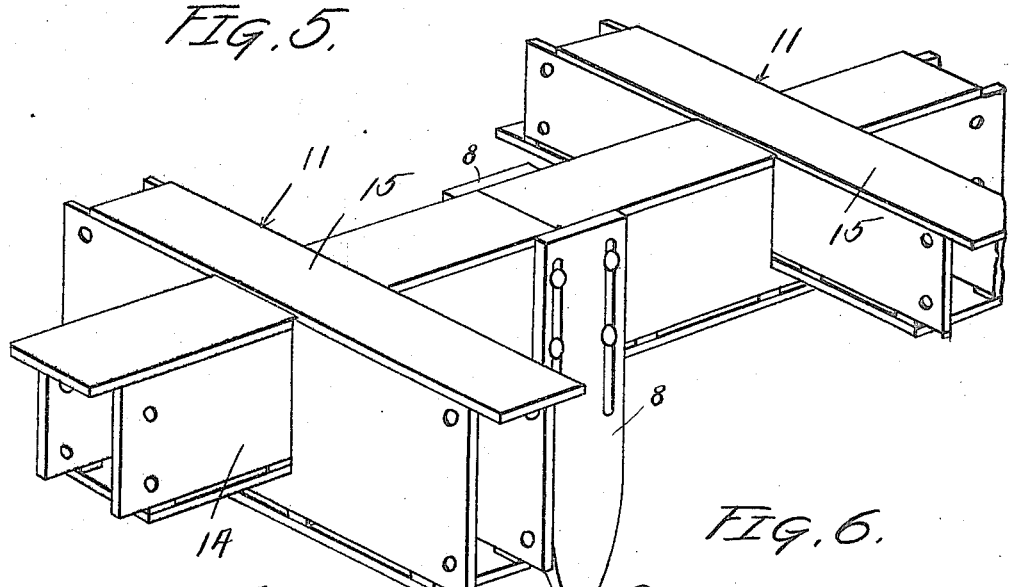
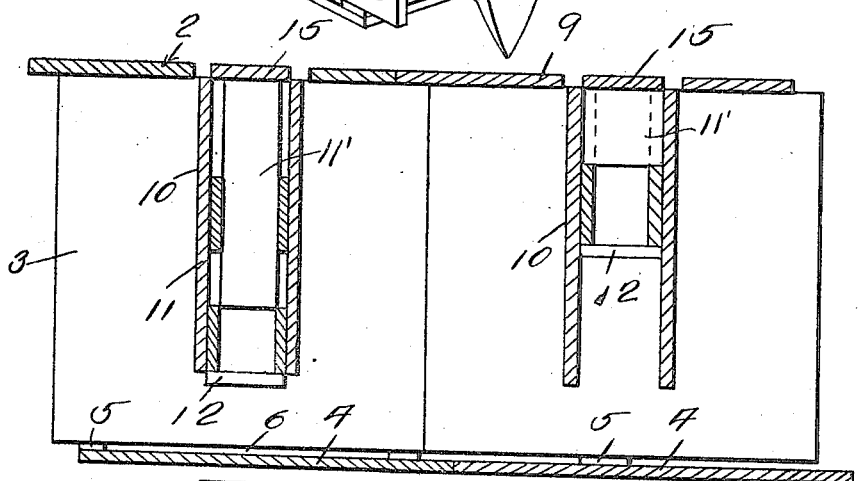
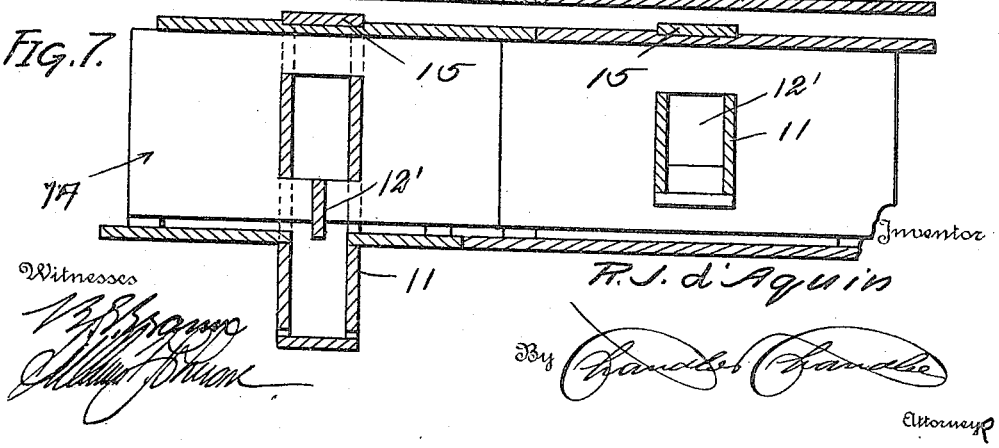

UNITED STATES PATENT OFFICE.

RICHARD J. D'AQUIN, OF FRENCH SETTLEMENT, LOUISIANA.

SYSTEM OF IRRIGATION.

1,229,898.  Specification of Letters Patent.  Patented June 12, 1917.

Application filed August 11, 1915. Serial No. 44,994.

*To all whom it may concern:*

Be it known that I, RICHARD J. D'AQUIN, a citizen of the United States, residing at French Settlement, in the parish of Livingston, State of Louisiana, have invented certain new and useful Improvements in Systems of Irrigation; and I do hereby declare the following to be a full, clear, and exact description of the invention, such as will enable others skilled in the art to which it appertains to make and use the same.

The present invention is directed to improvements in systems for irrigating soil, and has for its object to provide a system so arranged that the soil will be effectually irrigated by rain water, or from a suitable source of water supply.

A further object of the invention is to provide a system, so arranged that during the irrigation of the soil, the soil will also be aerated, thus adding to the productive qualities of soil.

Another object of the invention is to provide a system of irrigation arranged in such a manner that the water will, in seeping through the soil, pass downwardly from one irrigating conduit to another, thus insuring proper moisture to the soil.

A still further object of the invention is to provide a system of irrigation, so arranged that the tops of certain of the ditch sections will serve as tracks for the wheels of a truck, which may be used for removing the gathered crops from the field, or for any other purpose desired.

With these and other objects in view, this invention resides in the novel features of construction, formation, combination and arrangement of parts to be hereinafter more fully described, claimed and illustrated in the accompanying drawing, in which :—

Fig. 2 is a sectional view on line 2—2 of Fig. 1.

Fig. 3 is a sectional view on line 3—3 of Fig. 1.

Fig. 4 is a detail perspective view of a pair of conduit sections, showing the manner in which the adjacent ends thereof are connected.

Fig. 5 is a similar view of a pair of conduit sections, which are connected to the sections illustrated in Fig. 4.

Fig. 6 is a sectional view on line 6—6 of Fig. 1.

Fig. 7 is a sectional view on line 7—7 of Fig. 1.

Figure 1:
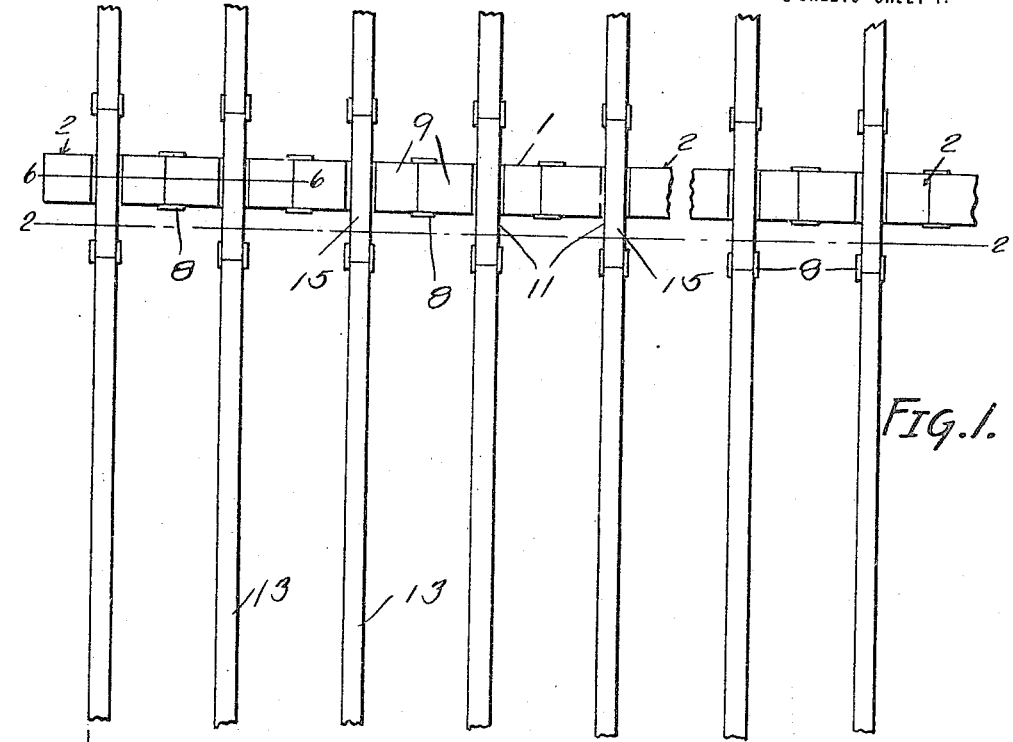
Figure 1 is a plan view of a field, showing the same equipped with the system.
Figure 1:
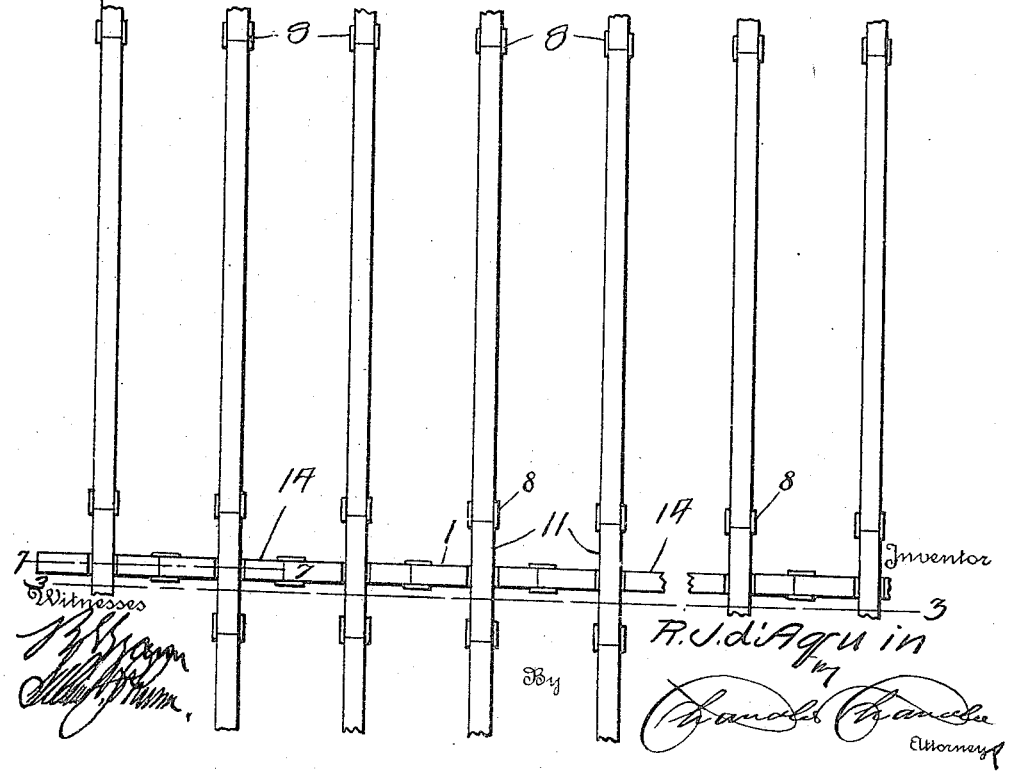

Referring to the drawings 1 indicates a conduit, which runs east to west of the field, said conduit being in parallel relation to similarly constructed conduits, some of which may be of less depth than others, as shown at the bottom of Fig. 1. The conduit 1 shown at the top of Fig. 1 consists of a plurality of sections 2, each of which is formed from wood, preferably cypress. Each section comprises sides 3, and bottom 4, said bottom being held in spaced relation from the sides by spacing blocks 5, whereby slots 6 are provided at the bottom of the conduit. The sections forming the conduit 1 are preferably two and one-half feet deep, said sections having their adjacent ends provided with bolts 6', which engage in the slots 7, formed in the stakes 8, said stakes being of such length that they can be driven into the bottom of the ground ditch, which is of course dug for receiving the sections, thereby firmly holding the adjacent ends of the sections in engagement, and at the same time preventing said sections from creeping. The stakes are comparatively long, and after the same have been driven into the ground, the upper ends thereof are sawed off so as to be in a plane with the covers 9 of the sections 2.

Each section 2 has its sides 3 recessed, as at 10, for receiving a section 11, and since the sections 11 are constructed similar to the sections 2, it is thought that the description of one will suffice for both. The sections 11 are disposed at right angles to the sections 2, and are preferably two feet deep, said sections 11 communicating with the sections 2 through the openings 12 formed in the bottoms thereof. Thus it will be seen that the sections 11 are of less depth than the sections 2. It will also be noted by referring to Fig. 2, that all of the sections 11 are not of the same depth, every fifth one being deeper than the preceding four.

Intermediate sections 13 are provided, and are constructed in the same manner as those hereinbefore described, said sections being of any desired length, and are adapted to have their ends connected by stakes 8, to the adjacent ends of the sections 11. The sections 11 are also intersected by sections 14, which are preferably one and one-half feet deep and form the parallel conduit 1 shown at the bottom of Fig. 1. Since all of the sections are arranged in intersecting relation, it is obvious that the same are all in communication with each other, so that water may flow from one to the other, whether it be rain water or water from a reservoir, or other source. If water from a reservoir is introduced into the system, it will be supplied thereto from any well known overhead system of irrigation, but of course it will not have the same beneficial results as will rain water.

The covers 15 of the sections 11 serve as tracks for the wheels of the truck 16, which can be wheeled from one end of the field to the other, and at which time the person operating the truck uses the covers as walks, thereby obviating the necessity of stepping on the soil. To permit the flanges of the truck wheels to pass over the sections 2, said sections have their tops 9 spaced a sufficient distance from the covers 15 of the sections 11 to pass through the spaces.

The conduits are spaced preferably one hundred feet apart, and serve as means for draining superfluous water from the system in case of very heavy rain, the ends of said conduits being in communication with natural ditches or drains.

The tops 9 being spaced at their ends from the tops 15 leave sufficient space for rain water to enter the sections 2, of the conduit 1 and the conduit made up of the sections 14 and the water will collect in said sections and be absorbed by the soil. It will be of course understood that the water falling on the soil between the spaces formed by the sections, will enter the slots of the highest sections, if not all absorbed by the adjacent soil. Thus it will be seen that if the rain is heavy, it will gravitate successively from the highest to the lowest sections. It is of course obvious that the sections will also serve to aerate the soil, thus promoting the growth of the crop.

As shown in Fig. 6, partitions 11' are arranged at the intersection of the sections 2 and 11, and serve to deflect the water positively from the sections 11 into the respective sections 2. Partitions 12' for a similar purpose are arranged at the intersection of the sections 11 and 14, as shown in Fig. 7.

What is claimed is:—

1. In an irrigation system, two conduits arranged in intersecting relation, said conduits being of unequal depth whereby at the point of intersection the bottom of the shallow conduit is spaced above the bottom of the deeper conduit, said shallow conduit having a port in the bottom thereof for establishing communication between the two conduits, and a partition in the shallow conduit so disposed with reference to said port as to direct into the deeper conduit a portion of the water flo... shallow conduit.

2. In an irrigation system, two conduits arranged in intersecting relation, said conduits being of unequal depth whereby at the point of intersection the bottom of the shallow conduit is spaced above the bottom of the deeper conduit, said shallow conduit having a port in the bottom thereof for establishing communication between the two conduits, a partition in the shallow conduit so disposed with reference to said port as to direct into the deeper conduit a portion of the water flowing through the shallow conduit, and covers for said conduits arranged in spaced relation.

3. In an irrigation system, two conduits arranged in intersecting relation and having sides and bottoms, means for spacing said bottoms from the lower edges of said sides, said conduits being of unequal depth whereby at the points of intersection the bottom of the shallow conduit is spaced above the bottom of the deeper conduit, said shallow conduit having a port in its bottom for establishing communication between the two conduits, and a partition in the shallow conduit so disposed with reference to said port as to direct into the deeper conduit a portion of the water flowing through the shallow conduit.

4. In an irrigation system, two conduits arranged in intersecting relation and having sides and bottoms, means for spacing said bottoms from the lower edges of said sides, said conduits being of unequal depth whereby at the points of intersection the bottom of the shallow conduit is spaced above the bottom of the deeper conduit, said shallow conduit having a port in its bottom for establishing communication between the two conduits, a partition in the shallow conduit so disposed with reference to said port as to direct into the deeper conduit a portion of the water flowing through the shallow conduit, and covers for said conduits arranged in spaced relation.

In testimony whereof, I affix my signature, in the presence of two witnesses.

RICHARD J. D'AQUIN.

Witnesses:
J. A. LASS,
F. F. STEPHENS.

Copies of this patent may be obtained for five cents each, by addressing the "Commissioner of Patents, Washington, D. C."